US010298475B2

United States Patent
Hagh et al.

(10) Patent No.: US 10,298,475 B2
(45) Date of Patent: May 21, 2019

(54) SYSTEM AND METHOD FOR JITTER-AWARE BANDWIDTH ESTIMATION

(71) Applicant: Nvidia Corporation, Santa Clara, CA (US)

(72) Inventors: Reza Marandian Hagh, San Jose, CA (US); Thomas Meier, Santa Clara, CA (US); Alok Ahuja, Santa Clara, CA (US); Aleksandar Odorovic, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 123 days.

(21) Appl. No.: 14/808,520

(22) Filed: Jul. 24, 2015

(65) Prior Publication Data

US 2017/0026259 A1  Jan. 26, 2017

(51) Int. Cl.
*H04L 12/26* (2006.01)
*H04L 12/24* (2006.01)
*H04L 12/841* (2013.01)
*H04L 12/801* (2013.01)

(52) U.S. Cl.
CPC ...... *H04L 43/0858* (2013.01); *H04L 43/0888* (2013.01); *H04L 43/0894* (2013.01); *H04L 41/0896* (2013.01); *H04L 47/10* (2013.01); *H04L 47/283* (2013.01)

(58) Field of Classification Search
CPC .. H04N 7/17336; H04N 19/187; H04L 29/06; H04L 43/0858; H04L 43/0888; H04L 43/0894; H04L 41/0896; H04L 47/10; H04L 47/283
See application file for complete search history.

(56) References Cited

U.S. PATENT DOCUMENTS

| | | | | |
|---|---|---|---|---|
| 2002/0169880 | A1* | 11/2002 | Loguinov | H04L 41/0896 709/228 |
| 2002/0186660 | A1* | 12/2002 | Bahadiroglu | H04L 29/06 370/248 |
| 2006/0146780 | A1* | 7/2006 | Paves | H04N 7/17336 370/348 |

(Continued)

OTHER PUBLICATIONS

Johnsson, Andreas, "Bandwidth Measurements in Wired and Wireless Networks," Malardalen University Licentiate Thesis No. 48, Department of Computer Science and Electronics, Vasteras, Sweden, Apr. 2005, 118 pages.

(Continued)

*Primary Examiner* — Vinncelas Louis
(74) *Attorney, Agent, or Firm* — Kevin Brown; Parker Justiss, P.C.

(57) ABSTRACT

A receiver and method for estimating an available bandwidth of a data channel streaming video data are provided. In one embodiment, the receiver includes: (1) a physical interface configured to receive the video data from a network, (2) a packet memory configured to store frames of the video data, (3) a dispersed packet time calculator configured to calculate a total time for one of the frames to go through the data channel, and (4) a bandwidth estimator configured to determine the available bandwidth of the data channel based on a number of data units received for the one frame and the total time.

15 Claims, 2 Drawing Sheets

(56) References Cited

U.S. PATENT DOCUMENTS

2012/0102136 A1* 4/2012 Srebrny .............. H04L 12/1886
 709/213
2017/0026653 A1* 1/2017 Xie ...................... H04N 19/187

OTHER PUBLICATIONS

Yuan, Zhenhui, et al., "A Novel Bandwidth Estimation Algorithm for IEEE 802.11 TCP Data Transmissions," WCNC 2012 Workshop on Wireless Vehicular Communications and Networks, 6 pages.
Lee, Heung Ki, et al., "Bandwidth Estimation in Wireless LANS for Multimedia Streaming Services," Advances in Multimedia, Nov. 2, 2006, 4 pages.
Li, Mingzhe, et al., "WBest: A Bandwidth Estimation Tool for IEEE 802.11 Wireless Networks," Computer Science Department at Worcester Polytechnic Institute, Jul. 1, 2006, 8 pages.
Mascolo, Saverio, et al., "TCP Westwood: Bandwidth Estimation for Enhanced Transport over Wireless Links," MobiCom, ACM ISBN, Rome, Italy, Jul. 2001, 11 pages.

* cited by examiner

SYSTEM AND METHOD FOR JITTER-AWARE BANDWIDTH ESTIMATION

TECHNICAL FIELD

This application is directed, in general, to data communication and, more specifically, to a system and method for bandwidth estimation that provides for jitter.

BACKGROUND

Game streaming, such as carried out by NVIDIA's GRID and PC2Shield platforms, is a challenging issue when it is conducted over the Internet or any other network with time-varying characteristics. While these networks are well-suited for transporting data, the rate at which it transports data is not constant. Variable latency (delay) and jitter (rapid variations in latency) present ongoing issues for time-sensitive data and impair quality of service (QoS).

Not only must these networks bear traffic that changes unpredictably, but any given data channel between a transmitter (e.g., server) and a receiver (e.g., client) is likely to include a variety of physical links of sundry types and capacities, such as Ethernet, 2.4 GHz or 5 GHz WiFi and cellular connections such as Long-Term Evolution (LTE) with different protocol layers. Adding to the complexity is that if the receiver is mobile, the physical links are likely to change as the receiver roams. Accordingly, characteristics of the data channel should be monitored such that the bandwidth it has for the transmission of data can be estimated. The rate and manner in which data is transmitted over the data channel may then be modified based on the estimated bandwidth. Various approaches and corresponding tools have been developed to estimate the bandwidth available to bear user data.

Some of the approaches involve using "probing" data packets to evaluate bandwidth. DietTOPP (Johnsson, et al., "DietTopp: A First Implementation and Evaluation of a Simplified Bandwidth Measurement Method," In proc. of the Second Swedish National Computer Networking Workshop (SNCNW), Karlstad, 2004) and WBest (Li, et al., "WBest: a Bandwidth Estimation Tool for IEEE 802.11 Wireless Networks," In Proceedings of 33rd IEEE Conference on Local Computer Networks (LCN), Montreal, Quebec, Canada, 2008) are two popular probing-based approaches. DietTOPP estimates available bandwidth by comparing the adapted probing rate and the corresponding data throughput. WBest uses a probing packet-pair dispersion technique to estimate the effective capacity of a wireless network and a probing packet train technique to infer mean and standard deviations of available bandwidth. Unfortunately, probing packets require their own bandwidth, representing overhead that decreases the bandwidth available for user data. Both DietTOPP and WBest require high numbers of probing packets to determine the maximum capacity of the data channel and thereby estimate the data channel bandwidth.

Various approaches and tools have been developed that do not require probing packets. Some are "single-layer" approaches, such as those that measure the Transmission Control Protocol (TCP) abstraction layer, e.g., Mascolo, et al., "TCP Westwood: Bandwidth Estimation for Enhanced Transport over Wireless Links," MobiCom '01, pp. 287-297 (2001), and TCP in the context of IEEE 802.11, e.g., Yuan, et al., "A Novel Bandwidth Estimation Algorithm for IEEE 802.11 TCP Data Transmissions," Wireless Communications and Networking Conference Workshops (WCNCW), pp. 377-382 (2012). Unfortunately, single-layer approaches do not accurately estimate the bandwidth of a data channel having links of disparate physical types with different abstraction layers, e.g., User Datagram Protocol (UDP). "Cross-layer" approaches do exist, e.g., IdleGap (Lee, et al., "Bandwidth Estimation in Wireless LANs for Multimedia Streaming Services," In Proc. of IEEE ICME, July 2006, pp. 1181-1184 (2006)). Unfortunately, IdleGap obtains the wireless link idle rate from the Network Allocation Vector (NAV) and transmits it to the application layer. This requires additional data to be transmitted, which is intrusive and adds overhead into the data channel. Further, the estimates IdleGap produces are dependent on how lower layers of the network have been implemented. Thus, the estimates may not be reliable.

SUMMARY

One aspect provides a method of estimating an available bandwidth of a data channel streaming video data. In one embodiment, the method includes: (1) calculating a total time for a frame of the video data to be received through the data channel and (2) determining the available bandwidth of the data channel based on a number of data units received for the frame and the total time.

Another aspect provides a receiver for estimating an available bandwidth of a data channel streaming video data. In one embodiment, the receiver includes: (1) a physical interface configured to receive the video data from a network, (2) a packet memory configured to store frames of the video data, (3) a delay estimator configured to calculate a total time for one of the frames to go through the data channel and (4) a bandwidth estimator configured to determine the available bandwidth of the data channel based on a number of data units received for the frame and the total time.

Yet another aspect provides an end-user device capable of estimating an available bandwidth of a data channel streaming video data. In one embodiment, the end user device includes: (1) a receiver configured to calculate a total time for a frame of the video data to be received through the data channel, and determine the available bandwidth of the data channel based on a number of data units received for the frame and the total time and (2) a display coupled to the receiver and configured to display the video data.

BRIEF DESCRIPTION

Reference is now made to the following descriptions taken in conjunction with the accompanying drawings, in which.

DETAILED DESCRIPTION

Figure 1:
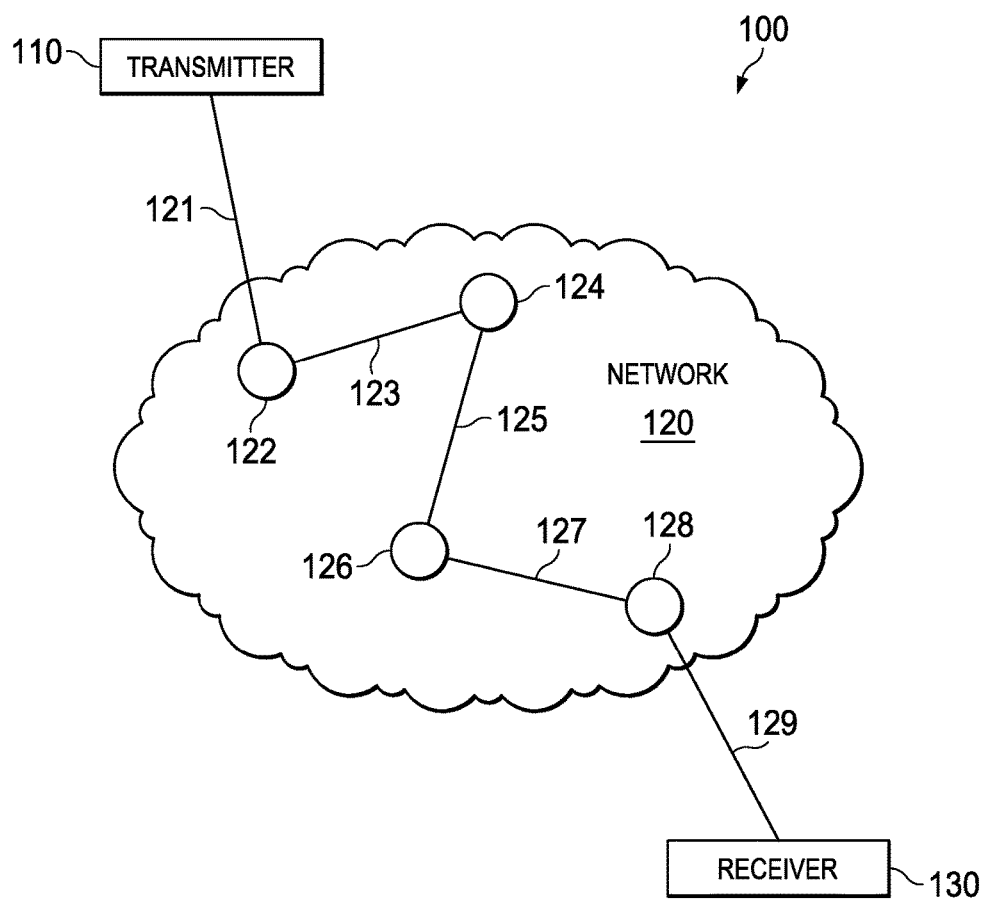
FIG. 1 is a block diagram of a portion of a network in which a data channel having physical links of multiple types exists.

As stated above, various approaches and corresponding tools have been developed to estimate the available bandwidth of a data channel to bear user data. However, the conventional approaches described above are designed for general use; they do not make any assumptions about the form or content of the user data.

It is realized herein that the available bandwidth of a data channel may be accurately estimated without having to use probing packets or other intrusions that exact an overhead penalty when the data channel is bearing streaming video data, because bandwidth estimation can instead take advantage of the periodicity of the video data, the fact that the video packets of any given stream are transmitted at defined, periodic rates.

Those skilled in the pertinent art understand that video data is streamed through a network by segmenting frames of the video data into multiple Internet Protocol (IP) packets and transmitting the packets in time-sequence. It is specifically realized herein that bandwidth estimation may be based on the pattern of periodicity in the time-sequenced packets.

It is further realized herein that wireless channel contentions, retransmissions and scheduling delays often appear in form of jitter. It is yet further realized that the periodic data patterns inherent in video data can also be used to estimate jitter, which is another useful metric in determining and maintaining QoS.

Introduced herein are various embodiments of a system and method for jitter-aware bandwidth estimation that view a multi-hop network as a single aggregated time-varying channel. The system and method measure data dispersion in the data channel and calculate jitter to take into account for instantaneous factors that often limit available bandwidth. The system and method are not limited to TCP and thus are capable of operating on UDP and TCP traffic.

Certain embodiments of the system and method are able to use data dispersion and jitter to estimate available bandwidth over the duration of the latest frame of video data transmitted (e.g., 17 or 33 ms in duration). These embodiments are able to estimate "instantaneous" bandwidth with little delay.

In general, the system and method embodiments introduced herein use the information in video frames to estimate the bandwidth available to the application streaming the video data and the average jitter. Various of the embodiments enjoy one or more of the following advantages:

First, unlike previous approaches, probe packets and other intrusive communications are not needed. No capacity need be wasted for bandwidth measurement, and streaming need not be delayed or interrupted. Delay and interruption are particularly disadvantageous when the video stream being transmitted is in the context of gaming. Player reactions and attitude are often severely impaired when video streams are delayed or interrupted.

Second, estimation can be performed in the presence of in-network traffic, contention for network bandwidth by traffic outside of the data channel and congestion in the network.

Third, estimation can still be performed accurately even in the face of packet loss, at least to some extent.

Fourth, the estimates of jitter due to errors and contentions in the data channels and the true bandwidth available to the application transmitting the stream account not only for in-network traffic but also errors due to out-of-network interference in wireless channels. Most conventional approaches ignore jitter altogether. However, jitter is an important determinant of video quality and critical for video-stream-based gaming.

Fifth, UDP, TCP and any type of traffic in the network may be accommodated, as long as periodic video frames are being sent. The video frames carry the needed timing information needed for estimation. No changes are required to the transmitter or the packets.

Sixth, bandwidth and jitter estimation may be carried out continually with relatively little processing and memory overhead. In certain embodiments, bandwidth and jitter estimation may be run continually to allow channel bandwidth and jitter to be actively monitored, and the transmission of the video stream to be adjusted, to deliver a superior video experience. Unlike conventional approaches, the stream need not be interrupted to carry out monitoring and estimation.

Seventh, the transmitter and receiver need not be synchronized. Their respective clocks may drift relative to one another as frames of video data are transmitted.

Before illustrating and describing certain embodiments of the system and method, a network that provides a data channel for the transmission of streaming video data, including game streaming video data, that can be measured and estimated in terms of bandwidth and jitter will be illustrated and described.

FIG. 1 is a block diagram of a network 120 and a client-server architecture system 100 that communicates through the network 120. The network 120 may be a wired network, a wireless network or a hybrid network having both wired and wireless networks.

The server-client architecture system 100 includes a transmitter 110 and a receiver 130. The transmitter 110, e.g., a server, transmits streaming video data, e.g., game streaming video data, to the receiver 130, e.g., a client. In the illustrated embodiment, the transmitter 110 is freely scalable and has the capacity to provide the streaming video data to many receivers simultaneously.

The receiver 130 receives the transmitted streaming video data for display. The receiver 130 can be a variety of end-user devices, including a desktop or laptop personal computer, a tablet, a smartphone or a television.

The network 120 provides a data channel that carries streaming video data from the transmitter 110 to the receiver 120. The data channel includes multiple physical links 121, 123, 125, 127, 129 connected by multiple routers 122, 124, 126, 128.

The physical links 121, 123, 125, 127, 129 may be of various mediums or types, including Ethernet, Wi-Fi, and cellular connections, such as LTE. Traffic passing through those links may use various protocols, including TCP and UDP.

Certain embodiments of the system and method will now be illustrated and described. The illustrated embodiments generally measure the time from expected arrival time of the first packet to the time that it receives the last packet of the same frame. The available bandwidth may then be calculated as the number of bytes received for the frame divided by the measured time over which that number of bytes was received.

Figure 2:
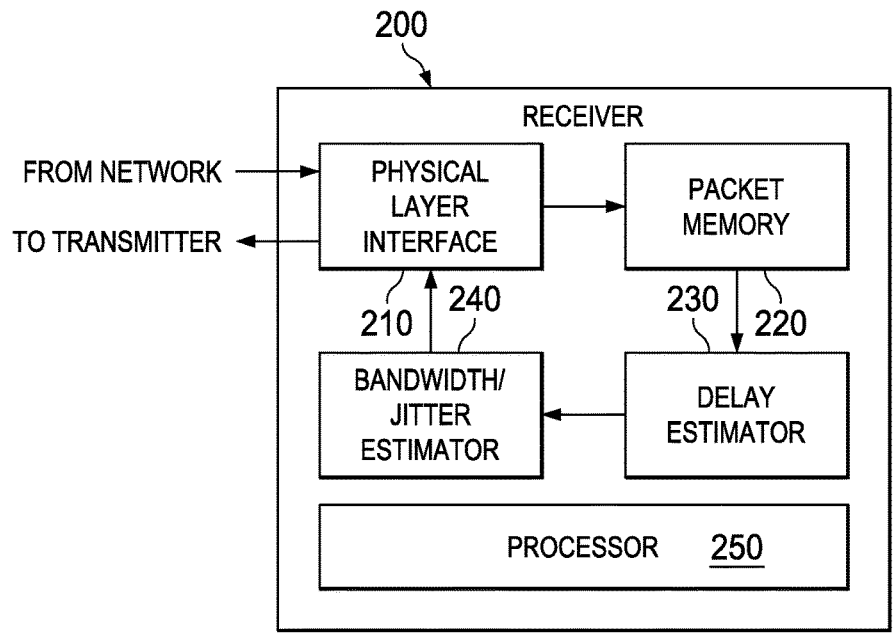
FIG. 2 is a block diagram of one embodiment of a receiver for jitter-aware bandwidth estimation.

FIG. 2 is a block diagram of one embodiment of a receiver 200, such as the receiver 130 of FIG. 1, for jitter-aware bandwidth estimation. The receiver 200 includes a physical layer interface 210, a packet memory 220, a delay estimator 230, a bandwidth/jitter estimator 240, and a processor 250.

The physical layer interface 210 is configured to receive streaming video data, e.g., game streaming video data, from a network such as the network 120 in FIG. 1 via a data channel. The streaming video data are sent periodically in frames, which are segmented into multiple IP packets. The physical layer interface 210 may be a stand-alone module or may be built into a network interface card (NIC) (not shown) of the receiver 200.

The packet memory 220 is configured to store frames of the received streaming video data. In one embodiment, the packet memory 220 is in the form of a buffer. The packet memory 220 may be located in a NIC or the processor 250.

The delay estimator 230 is configured to calculate a total time for a frame of the received video data to be received through the data channel. In one embodiment, the delay estimator 230 may be a set of instructions stored in a non-transient medium, such as a memory that when executed by the processor 250, perform a function of calculating a total time for a frame of the received video data to be received through the data channel.

A particular embodiment of the receiver 200 will now be described. To calculate the total time for a given frame of the received video data to be received through the data channel, the delay estimator 230 is configured first to estimate a constant delay in the data channel. 'minOneWayDelay' is defined as the constant delay in the data channel when no jitter is present. The constant delay is estimated as following:

$$minOneWayDelay=min(RxTimeClientFirstPacket[i]-TxTimeServerFirstPacket[i])i=1, \ldots N \text{ frames},$$

where i is the frame index, RxTimeClientFirstPacket[i] is the time at which the first packet of frame i has been received at the receiver, and TxTimeServerFirstPacket[i] is the time at which the first packet of the frame has been sent from the transmitter/server. For simplicity, it is assumed that the times in the transmitter/server and the receiver/client have been synchronized. In some embodiments, synchronization is not assumed, and compensation for lack of synchronization is provided.

In some embodiments, estimates are considered accurate when jitter is below a predefined threshold. In the illustrated embodiment, estimates are considered accurate when one packet in the last N packets has no channel jitter. In one specific embodiment, N=100.

Once the constant delay is estimated, the delay estimator 230 is configured to calculate an expected arrival time of the first packet of that given frame, i.e. frame i. This is the time that the first packet could be expected if there was no jitter in the data channel (e.g., caused by retransmission or channel contentions that reduce available bandwidth. 'expectedArrivalTime' is defined as the expected arrival time and is calculated as follows:

$$expectedArrivalTime=(TxTimeServerFirstPacket[i]+MinOneWayDelay).$$

Using the expected arrival time, the delay estimator 230 finally calculates the total time it takes for frame i to pass the data channel. 'dispersedPacketTime' is defined as the total time and is calculated as follows:

$$dispersedPacketTime=RxTimeClientLastPacket[i]-(TxTimeServerFirstPacket[i]+minOneWayDelay),$$

where RxTimeClientLastPacket [i] is the time that the last packet of frame i has been received at the receiver.

Based on the calculated total time and a number of data units, e.g., bytes or bits, received for the frame i, the bandwidth estimator 240 is configured to determine an instantaneous estimated bandwidth of the data channel. "BWE" is defined as the instantaneous estimated bandwidth of the data channel and is calculated as follows:

$$BWE=numberOfBytesRecieved/disperedPacketTime.$$

In one embodiment, the bandwidth estimator 240 employs a smoothing filter such as an infinite impulse response filter (IIR) to calculate an average estimated bandwidth. In some embodiments, the bandwidth estimator 240 is implemented as a set of instructions stored in a non-transient medium that, when executed by the processor 250, performs a function of calculating an available bandwidth of a data channel.

Figure 3:
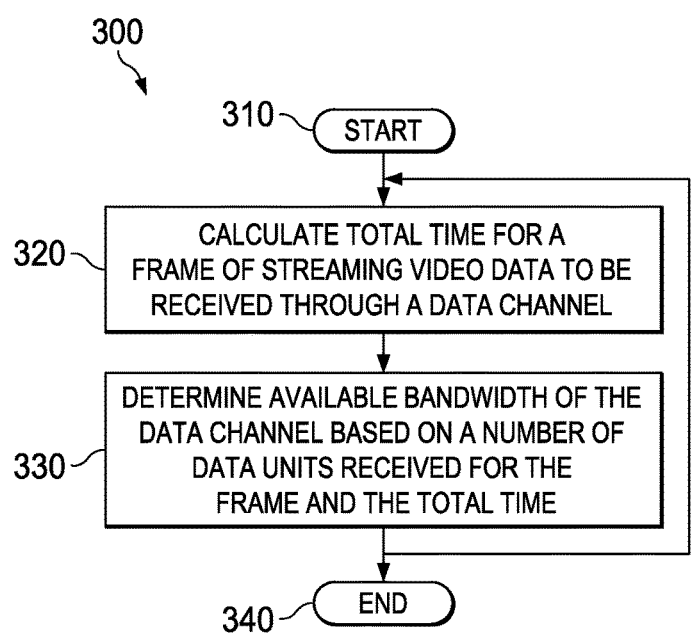
FIG. 3 is a flow diagram of one embodiment of a method of jitter-aware bandwidth estimation.

FIG. 3 is a flow diagram of one embodiment of a method of jitter-aware bandwidth estimation. The disclosed method 300 is implemented in a network where video data, such as game streaming video data is streamed over a data channel having multiple types of physical links. The method 300 begins in a start step 310.

In a step 320, a total time for a frame of streaming video data to be received through a data channel is calculated. Before calculating the total time, the constant delay in the data channel and an expected arrival time of the first packet of the frame are determined.

In one embodiment, the constant delay is estimated as a function of a time that the first packet of the frame has been received and a time in which the first packet of the frame has been sent. The constant delay is estimated based on a frame that has experienced the least delay over the network.

In one embodiment, the expected arrival time of the first packet of the frame is calculated a sum of the constant delay in the data channel and a time in which the first packet of the frame has been sent.

In one embodiment, once the constant delay and the expected arrival time are determined, the total time is calculated as a difference between a time the last packet of the frame has been received and the expected arrival time of the first packet of the frame.

In step 330, an available bandwidth of the data channel is determined based on the total time and a number of data units received for the frame. In one embodiment, the available bandwidth of the data channel is calculated by dividing the number of data units received for the frame with the total time. In a related embodiment, the data units are in bytes. In an alternative embodiment, the data units are in bits.

The steps 320 and 330 may then be repeated for continual channel monitoring. As the method 300 does not use probing packets but relies on the ongoing streaming video data, it presents an insubstantial, or even no, extra overhead or burden to the data channel. The method ends in a step 340.

While the method disclosed herein has been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

The above-described apparatuses and methods or at least a portion thereof may be embodied in or performed by various, such as conventional, digital data processors or computers, wherein the computers are programmed or store executable programs of sequences of software instructions to perform one or more of the steps of the methods, e.g., steps of the method of FIG. 3. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, e.g., one or more of the steps of the method of FIG. 3, or functions of the apparatuses described herein, e.g., a receiver and an end-user device.

Certain embodiments of the invention further relate to computer storage products with a non-transitory computer-readable medium that have program code thereon for performing various computer-implemented operations that embody the apparatuses, the systems or carry out the steps of the methods set forth herein. For example, a delay estimator and a bandwidth estimator can be implemented as such a computer storage product. Non-transitory medium used herein refers to all computer-readable media except for transitory, propagating signals. Examples of non-transitory computer-readable medium include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this application relates will appreciate that other and further additions, deletions, substitutions and modifications may be made to the described embodiments.

What is claimed is:

1. A method of estimating an available bandwidth of a data channel streaming video data by a receiver, comprising:
   receiving said video data by said receiver;
   calculating a dispersed packet time for a frame of said video data to be received through said channel, wherein said dispersed packet time is an actual time a last packet of said frame of video data is received by said receiver less an expected arrival time of a first packet of said frame of video data and said expected arrival time is a sum of an estimate of a constant delay in said channel and a time at which said first packet of said frame has been sent; and
   determining said available bandwidth of said channel based on a number of data units received for said frame and said dispersed packet time.

2. The method as recited in claim 1, wherein said constant delay is a function of a time at which said first packet of said frame has been received and a time at which said first packet of said frame has been sent.

3. The method as recited in claim 1, wherein said available bandwidth of said channel is calculated by dividing said number of data units received for said frame with said dispersed packet time.

4. The method as recited in claim 1, wherein said constant delay is estimated based on a frame that has experienced a least delay over the network.

5. The method as recited in claim 1, wherein said method is carried out repeatedly.

6. The method as recited in claim 1, further comprising modifying a rate and manner in which said video data is transmitted over said data channel based on said determined available bandwidth.

7. A receiver for estimating an available bandwidth of a data channel streaming video data, comprising:
   a physical interface configured to receive said video data from a network;
   a packet memory configured to store frames of said video data;
   a delay estimator configured to estimate a constant delay in said channel and configured to calculate a dispersed packet time for one of said frames to go through said channel, wherein said dispersed packet time is an actual time a last packet of said one of said frames of video data is received by said receiver less an expected arrival time of a first packet of said one of said frames of video data and said expected arrival time of said first packet of said one frame is a sum of said constant delay and a time at which said first packet of said one frame has been sent; and
   a bandwidth estimator configured to determine said available bandwidth of said channel based on a number of data units received for said one frame and said dispersed packet time.

8. The receiver as recited in claim 7, wherein said constant delay is a function of a time at which said first packet of said one frame has been received and a time at which said first packet of said one frame has been sent.

9. The receiver as recited in claim 7, wherein said expected arrival time of said first packet of said one frame is calculated based on said constant delay.

10. The receiver as recited in claim 7, wherein said available bandwidth is calculated by dividing said number of data units received for said one frame with said dispersed packet time.

11. The receiver as recited in claim 7, wherein said constant delay is estimated based on a frame that has experienced a least delay over the network.

12. The receiver as recited in claim 7, wherein said physical interface is further configured to report said available bandwidth of said channel to a sender of said video data.

13. The receiver as recited in claim 7, wherein said determined available bandwidth is sent from said receiver over said network.

14. An end-user device capable of estimating an available bandwidth of a data channel streaming video data, comprising:
   a receiver configured to:
      receive said video data and calculate a dispersed packet time for a frame of said video data to be received through said channel, wherein said dispersed packet time is an actual time a last packet of frame of video data is received by said receiver less an expected arrival time of a first packet of said frame of video data, said expected arrival time of said first packet of said frame is a sum of an estimated constant delay in said channel and a time at which said first packet of said frame has been sent,
      and determine said available bandwidth of said channel based on a number of data units received for said frame and said dispersed packet time; and
   a display coupled to said receiver and configured to display said video data.

15. The end-user device as recited in claim 14, wherein said determined available bandwidth is sent from said receiver over said data channel.

* * * * *